Figure 1:
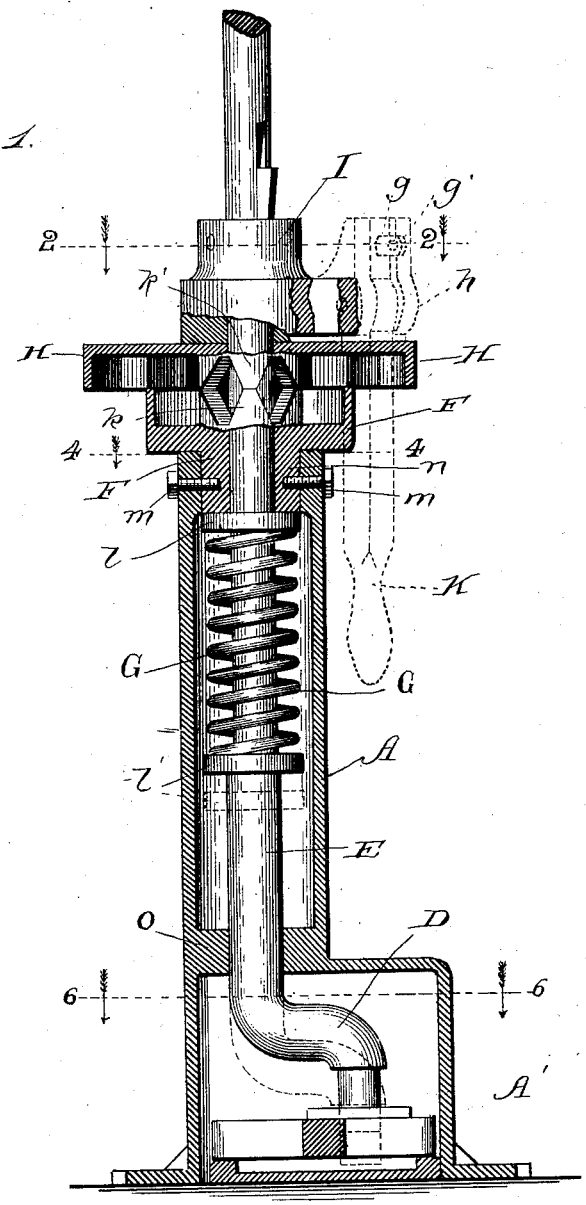

(No Model.)  2 Sheets—Sheet 1.

A. A. STROM.
SWITCH STAND.

No. 363,772.  Patented May 24, 1887.

Witnesses:
Chas. E. Gaylord
J. H. Dyrenforth

Inventor:
Axel A. Strom
By Dyrenforth & Dyrenforth
Attys.

(No Model.) 2 Sheets—Sheet 2.

A. A. STROM.
SWITCH STAND.

No. 363,772. Patented May 24, 1887.

Witnesses:
Chas. E. Gaylord,
J. W. Dyrenforth

Inventor:
Axel A. Strom
By Dyrenforth & Dyrenforth
Att'ys.

UNITED STATES PATENT OFFICE.

AXEL A. STROM, OF AUSTIN, ILLINOIS.

SWITCH-STAND.

SPECIFICATION forming part of Letters Patent No. 363,772, dated May 24, 1887.

Application filed February 5, 1887. Serial No. 226,637. (No model.)

*To all whom it may concern:*

Be it known that I, AXEL A. STROM, a citizen of the United States, residing at Austin, in the county of Cook and State of Illinois, have invented a certain new and useful Improvement in Switch-Stands; and I hereby declare the following to be a full, clear, and exact description of the same.

My present invention relates particularly to an improvement upon the stand for split switches for which Letters Patent of the United States, No. 337,352, were granted me on the 2d day of March, 1886.

The objects of my present, like those of my former, construction are to permit the switch to be opened automatically by the flange of the first locomotive-wheel which comes into contact with it, to permit the device to be readily and accurately readjusted, and also to be operated easily by hand. Further objects are to provide a switch stand of simple construction, involving few parts, and not liable to get out of order, and which is thoroughly effective in its purpose and reliable in its operation.

My present construction includes a hollow standard, a spindle extending through the standard, with a crank, normally off a dead-center, on its lower end to engage with a sliding yoke on the connecting-rod, a clutch comprising an absolutely-immovable part on the standard near its upper end, and a rotary and vertically-movable part imposed thereon and capable of being locked to and released from the spindle at will, and a confined spring surrounding the spindle below the immovable portion of the clutch, whereby the spindle, when unlocked from the clutch device, may be easily turned by hand to move the connecting-rod back and forth, and when locked to the clutch device affords substantially insuperable resistance to its being turned by hand, but is automatically movable through the connecting-bar by the flange of a locomotive-wheel, which forces inward the connecting-bar, thereby turning the upper or rotating part of the clutch upon the lower or immovable part, which operation causes the spindle to rise against the resistance of the surrounding spring, and the resistance of the latter tends to force the two clutch portions into engagement.

The absolutely-immovable portion of the clutch device constitutes the principal feature of novelty in my improvement, and it is the general construction of the same involving this feature, as also combinations of parts forming my improved construction, which constitute my invention.

Figure 2:
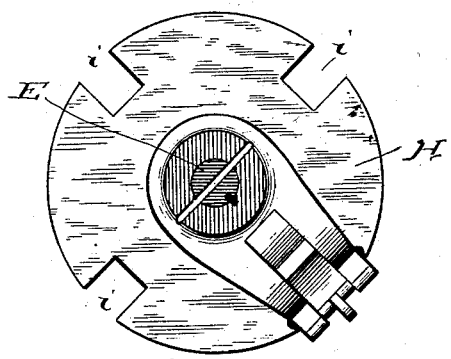
Figure 3:
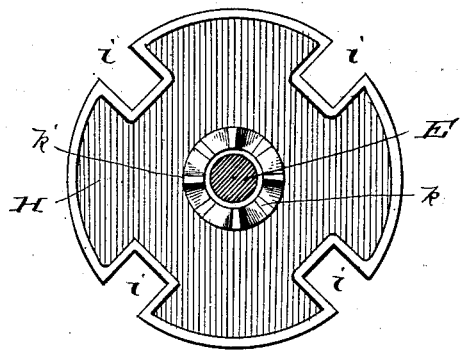
Figure 4:
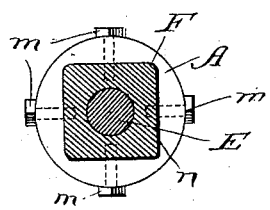
Figure 5:
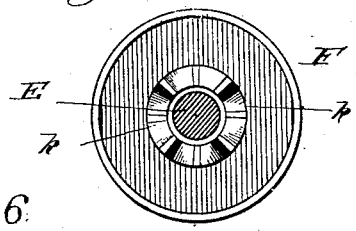

In the drawings, Figure 1 is an elevation of my improved switch-stand, mainly sectional and partly broken, and having the normal positions of parts indicated by means of dotted lines; Fig. 2, a section taken on the line 2 2 of Fig. 1 and viewed in the direction of the arrows; Fig. 3, a bottom view of the recessed rotatory-table detail, having teeth around its center to constitute the upper portion of the clutch device; Fig. 4, a section taken on the line 4 4 of Fig. 1 and viewed in the direction of the arrows; Fig. 5, a plan view of the lower portion of the clutch device; and Fig. 6, a section taken on the line 6 6 of Fig. 1, viewed in the direction of the arrows, and showing by dotted lines different positions of the crank.

Figure 6:
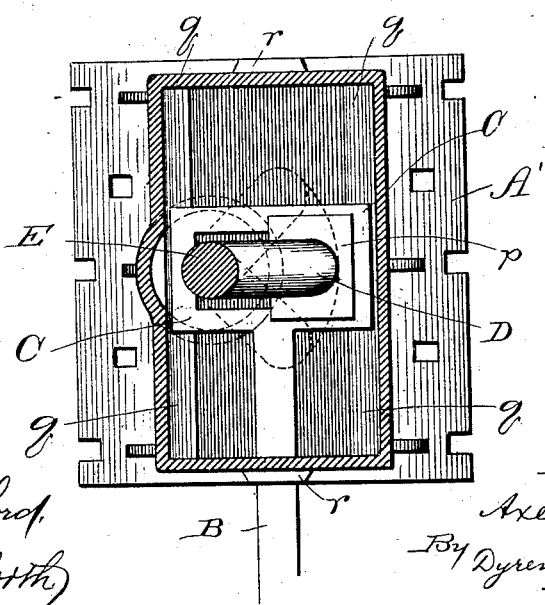

A is the hollow standard, having a flanged base, A', provided with an opening, $r$, Fig. 6, on each side, if desired, to admit the connecting-rod B, which ends in a transverse yoke, C, supported to slide back and forth in the base of the stand on lateral guides $q$, and containing a shifting-block, $p$, which receives the end of the crank D on the lower extremity of the spindle E, extending through the standard, as shown. The spindle is steadied by a web, O, near the base of the standard, and by a block, F, surrounding it at the upper end of the standard, into a reduced part of which it is inserted at its rectangular portion $n$, and rigidly secured to be immovable by means of screw-bolts $m$. Below the block F on the spindle are two collars, $l$ and $l'$, (the former of which could, however, be integral with the clutch-block F,) between which is confined a helical spring, G, surrounding the spindle. On the upper side of the block F are beveled teeth $k$.

H is a circular table, having recesses $i$ in its edge, equidistant apart, and provided on its lower surface with beveled teeth $k'$, to coincide with the teeth on the block F, whereby, when the table H is imposed upon the block F, the teeth $k$ and $k'$ form a clutch.

Above the recessed table and surrounding the spindle is a collar, I, keyed, as shown, to the spindle to move with it, and provided with a slotted extension, $h$, in which is pivoted a lever, K.

The operation of the device is as follows: Normally the lever K is vertical and within a recess $i$ in the table H. As will be seen, in this position (wherein the lever may be locked by a padlock or bolt inserted through staples $g$ and $g'$, respectively, on the lever and extension $h$, as shown) the spindle is connected with the clutch device, and cannot be turned by other than a power sufficient to force the teeth $k'$ out of engagement with the teeth $k$. This can only be done by incidentally raising the spindle, which has a vertical play equal or substantially equal to the vertical length of the clutch-teeth. When, therefore, the connecting-rod B is forced inward by the action upon a switch-rail of the flange of a locomotive-wheel, it tends to turn the crank normally off a dead-center, as described. The engagement of the teeth of the clutch device tends to resist the turning of the spindle through the medium of the crank, to do which the latter must rise, its rise being produced by the strain exerted through the spindle and lever K on the table H, which forces the clutch-teeth $k'$ out of engagement with the clutch-teeth $k$, thereby raising the table, and incidentally the spindle, by the abutment of the table against the collar I. In Fig. 1 the result of this operation is illustrated, the normal position of the spindle being shown by the dotted lines, its raised position by full lines, and the teeth of the upper rotatory portion of the clutch device raised by the torsion out of engagement with those of the lower portion of the same and about to pass over the extremities of the teeth of the latter and re-engage with the same. When the spindle is raised, it compresses the spring G, the resistance of which assists, by its tendency to force the spindle back to its normal position, in producing the re-engagement with the lower immovable part of the clutch of the upper movable part of the same.

By raising the lever K out of a recess $i$ in the table H, the spindle is disconnected from the clutch device, and may be turned with comparatively little resistance by hand to reset the switch.

What I claim as new, and desire to secure by Letters Patent, is—

1. In a switch-stand, the combination of a rotatory spindle provided with a crank and capable of vertical play, a confined spring, a clutch device through which the spindle extends to rotate independently thereof, and comprising an immovable clutch portion and a rotatory and vertically-movable clutch portion, and means, substantially as described, for interlocking and disconnecting the spindle and clutch device at will, substantially as and for the purpose set forth.

2. In a switch-stand, the combination of a rotatory spindle provided with a crank and capable of vertical play, a confined helical spring surrounding the spindle, a clutch device through which the spindle extends to rotate independently thereof, and comprising an immovable clutch-block, F, having teeth $k$, and a rotatory and vertically-movable recessed table, H, having teeth $k'$ to engage with the teeth $k$, and a lever pivotally connected with the spindle to engage normally with the recessed table, and thereby interlock the spindle and clutch device, substantially as and for the purpose set forth.

3. A switch-stand comprising, in combination, a hollow standard, A A', a rotatory spindle, E, supported in the standard to have vertical play and provided with a crank, D, on its lower end, a clutch-block, F, rigidly secured upon the standard near its upper end to surround the spindle and provided with teeth $k$, a helical spring, G, in the standard surrounding the spindle and confined on the same against the clutch-block F, a vertically-movable and rotatory recessed table, H, provided with teeth $k'$ on its under surface to engage with the teeth $k$ on the block F, and form with the same a clutch, a collar, I, secured upon the spindle above the table H, and a lever, K, pivotally connected with the collar to engage normally with the recessed table, and thereby interlock the spindle and clutch, substantially as and for the purpose set forth.

AXEL A. STROM.

In presence of—
J. W. DYRENFORTH,
FRANK L. DOUGLAS.